(12) United States Patent
Castelmezzano

(10) Patent No.: US 11,427,126 B2
(45) Date of Patent: Aug. 30, 2022

(54) REAR VIEW MIRROR

(71) Applicant: LUCERIX INTERNATIONAL COMPANY, Oakville (CA)

(72) Inventor: Pasquale Castelmezzano, Mississauga (CA)

(73) Assignee: LUCERIX INTERNATIONAL COMPANY, Oakville (CA)

( * ) Notice: Subject to any disclaimer, the term of this patent is extended or adjusted under 35 U.S.C. 154(b) by 525 days.

(21) Appl. No.: 16/432,345

(22) Filed: Jun. 5, 2019

(65) Prior Publication Data

US 2019/0375333 A1  Dec. 12, 2019

Related U.S. Application Data

(60) Provisional application No. 62/682,352, filed on Jun. 8, 2018.

(51) Int. Cl.
*B60R 1/08* (2006.01)
*B60R 1/06* (2006.01)
*B60R 1/072* (2006.01)

(52) U.S. Cl.
CPC ............ *B60R 1/081* (2013.01); *B60R 1/0605* (2013.01); *B60R 1/072* (2013.01); *B60R 1/083* (2013.01); *B60R 2300/202* (2013.01); *B60R 2300/8026* (2013.01)

(58) Field of Classification Search
CPC ....... B60R 1/081; B60R 1/0605; B60R 1/072; B60R 1/083; B60R 2300/202; B60R 2300/8026; B60R 1/002; B60R 1/07; B65F 3/00
See application file for complete search history.

(56) References Cited

U.S. PATENT DOCUMENTS

| 5,082,361 A * | 1/1992 | McKee | B60R 1/0607 359/876 |
| 5,721,646 A * | 2/1998 | Catlin | B60R 1/088 359/872 |
| 6,398,375 B1 * | 6/2002 | Englander | B60R 1/0605 359/865 |
| 7,540,060 B2 * | 6/2009 | Holmes | B60S 1/566 359/872 |
| 2001/0012164 A1 * | 8/2001 | Englander | B60R 1/0605 359/864 |
| 2014/0036366 A1 * | 2/2014 | van Velthuizen | B60R 1/06 359/507 |

* cited by examiner

*Primary Examiner* — James M Pontius
(74) *Attorney, Agent, or Firm* — Crowe & Dunlevy, P.C.

(57) ABSTRACT

The invention relates to a rear view mirror assembly for a vehicle comprising a housing configured for mounting to a vehicle; one or more mirror units disposed in the housing, wherein each mirror unit comprises a reflective mirror element and a mirror mount for securing the mirror element within the housing, wherein at least one mirror unit is an overhead mirror unit that is positioned to allow an operator in the vehicle to see an area that is behind the operator and above the vehicle.

19 Claims, 9 Drawing Sheets

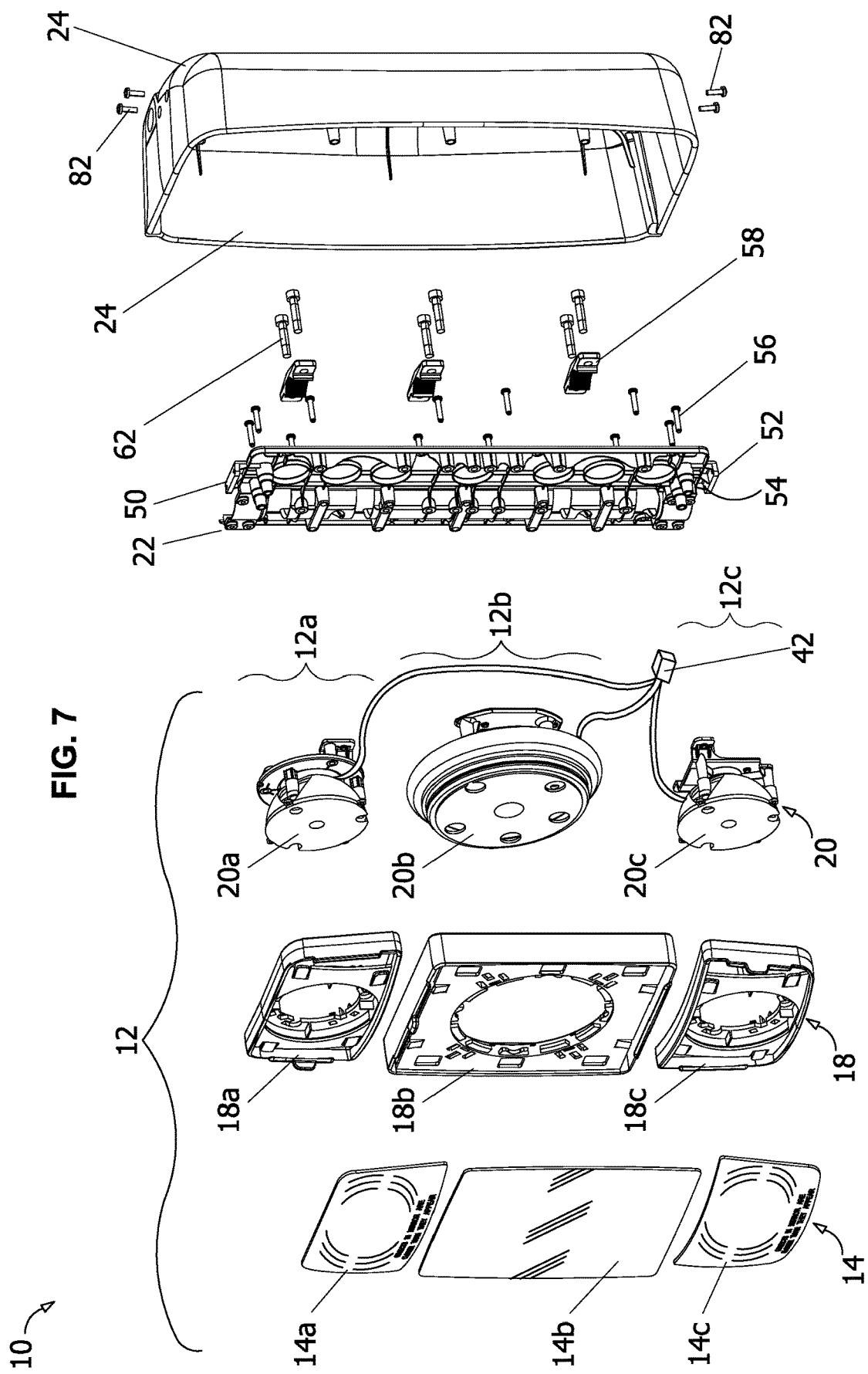

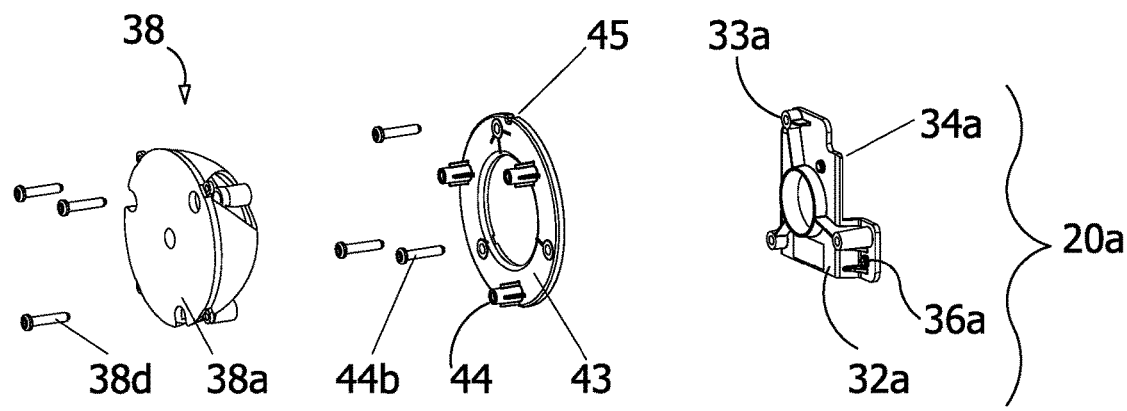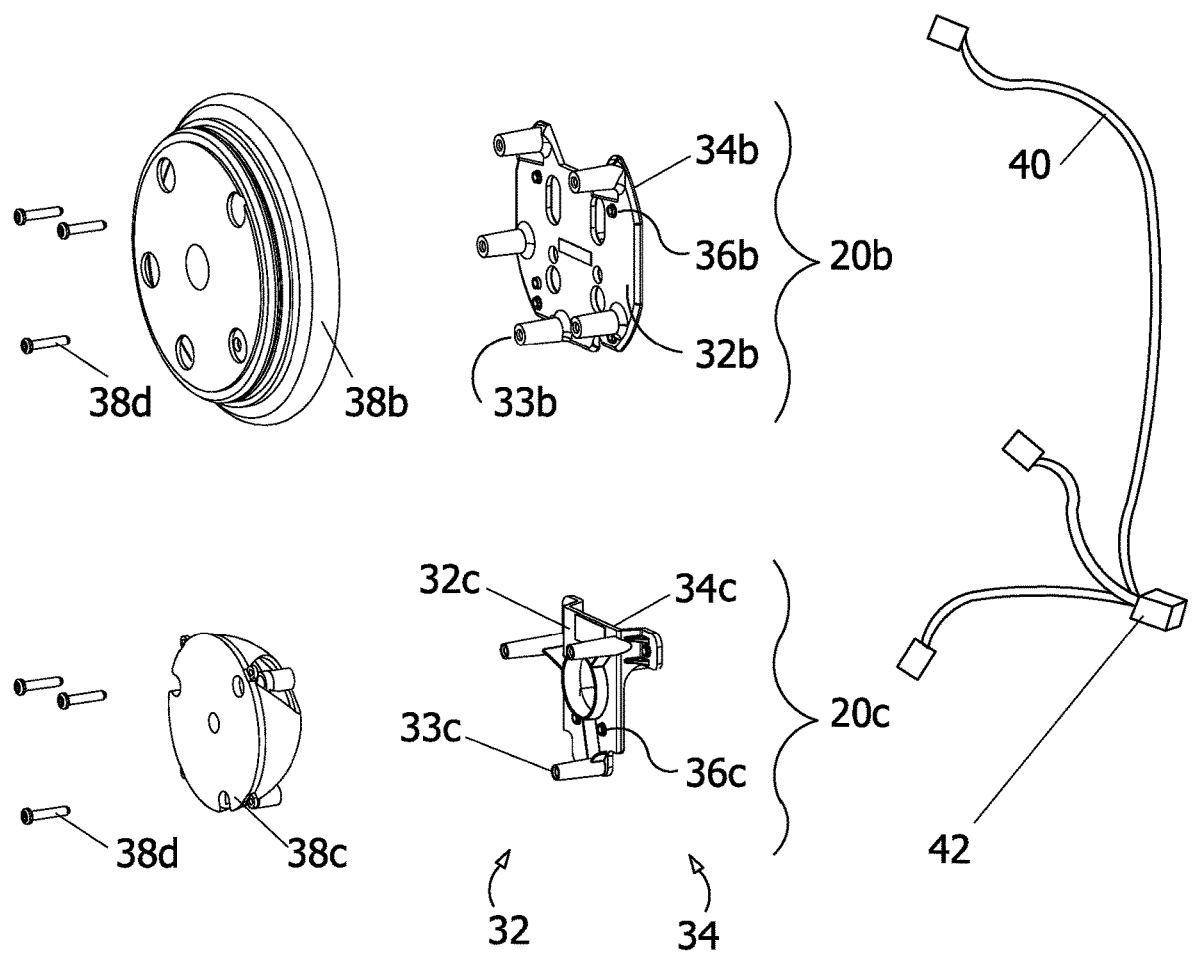
FIG. 9

REAR VIEW MIRROR

CROSS REFERENCE TO RELATED APPLICATIONS

This application claims the benefit of U.S. Provisional Patent Application No. 62/682,352 filed on Jun. 8, 2019. This application incorporates the foregoing application by reference into this document as if fully set out at this point.

TECHNICAL FIELD

The invention relates to a rear view mirror assembly, and, more particularly, to exterior mirrors for use on vehicles such as front loading garbage trucks and dump trucks.

BACKGROUND

Front loading garbage collection vehicles are common in the field of trash, garbage, refuse and/or recyclable materials removal. Typically, such vehicles are used in commercial applications for lifting and dumping commercial trash containers. The vehicles include a pair of lifting arms at the front of the truck, the arms having a corresponding pair of forks which engage channels in the sides or bottom of a trash can or other receptacle containing trash, garbage, refuse and/or recyclable materials.

The lifting arms and forks are typically operated by hydraulic cylinders which are manually controlled by a vehicle operator. A first set of hydraulic cylinders lifts the lifting arms and a second set of hydraulic cylinders rotates the forks on the lifting arms, when the lifting arms are raised, to dump refuse contained in the trash container into the vehicle body. Usually, the operator will first position the vehicle so that the forks are located within the channels, and lift the trash container above the vehicle cab in which the operator sits. Once the lifting arms are raised beyond this position, the operator selectively engages the hydraulic cylinder controls for the forks to rotate the trash container into a position for dumping.

Once the operator is aware that the garbage is inside the body of the trash truck, the operator may then cause the actuation of a packing blade to push the garbage to the rear end of the truck to make room for more trash, garbage, refuse and/or recyclable materials and to optionally allow for expulsion through the rear of the trash truck once full.

The operation detailed above is usually performed by one operator seated in the vehicle cab. However, once the trash container is lifted over top of the vehicle cab, the operator is no longer able to view the container because the view is obstructed by the roof of the vehicle. There may be instances where the operator would wish to monitor the progress of the lifting and rotation steps. But in order to do so, it would be necessary that the operator proceed by opening the window of the cab and then stick their head, at least partially, out of the window to look to the area to the rear and above the cab of the vehicle. The added steps required to monitor the operation are less than ideal. For instance, during extreme weather conditions (e.g. heat, cold, snow, and/or rain), the opening of the window would be inconvenient and uncomfortable for an operator.

In addition to the above example, other vehicles such as dump trucks with overhead curtains and closures, and trailer mounted crane or boon trucks and numerous other vehicles could benefit from the present concept for similar reasons.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

It is an embodiment of the invention to provide a rear view mirror assembly.

According to an embodiment, the rear view mirror assembly of the invention provides improved operator visibility in areas which are to the rear and above the cab of the vehicle, especially in vehicles such as front loading garbage collection trucks, dump trucks, dump trucks with overhead curtains and closures, and trailer mounted crane or boon trucks.

According to an embodiment, there is provided a rear view mirror assembly for a vehicle comprising
  a housing configured for mounting to a vehicle;
  one or more mirror units disposed in the housing, wherein each mirror unit comprises a reflective mirror element and a mirror mount for securing the mirror element within the housing, wherein at least one mirror unit is an overhead mirror unit that is positioned to allow an operator in the vehicle to see an area that is behind the operator and above the vehicle.

In one aspect, the mirror element of the overhead mirror unit has a convex shape.

In one aspect, the assembly comprising at least three mirror units.

In one aspect, the overhead mirror unit is positioned above all the other mirror units and wherein at least one mirror unit below the overhead mirror unit comprises a mirror element that has a flat and/or convex shape.

In one aspect, at least one of the mirror units further comprises a heating element secured the rear surface of the mirror element.

In one aspect, the at least one of the mirror units further comprises a mirror carrier between the mirror element and the mount, the mirror carrier configured to support the mirror element.

In one aspect, the mirror carrier comprises a forward facing peripheral rim defining a recess dimensioned to secure the mirror element.

In one aspect, the mirror mount is adjustable to provide movement of the mirror element within the housing to different viewing positions.

In one aspect, the mirror mount comprises a motor configured for moving the mirror element to various viewing positions when the motor is actuated.

In one aspect, the assembly comprising electrical wiring configured to connect a source of electrical power to said motor.

In one aspect, the housing has a first and second end walls, first and second side walls, a rear wall, wherein the first and second end walls and the first and second side walls define a peripheral rim defining an interior space within the housing and an opening adjacent the one or more mirror units.

In one aspect, the assembly further comprising a support bracket disposed within the interior space of the housing, the bracket having two ends, one end adjacent the first end wall and the other end adjacent the second end wall, wherein between the two ends, the bracket comprises: a mirror unit mount means configured to secure each one of the mirror mounts; an assembly mount means to secure the mirror assembly to the vehicle; or a combination thereof.

In one aspect, the mirror unit mount means comprise: bracket holes formed in the support bracket; and mounting holes formed in the mirror mount and configured to align with the bracket holes, wherein the bracket holes and the mounting holes are dimensioned to receive a suitably-sized screw therein to fasten the at least one mirror unit to the support bracket.

In one aspect, the assembly mount means comprise: bracket holes formed in the support bracket; and clamp members defining an aperture therein and configured to align with the bracket holes, wherein the support bracket and clamp member are configured to received therebetween a mirror arm of the vehicle and the bracket holes and the aperture are dimensioned to receive a suitably-sized screw therein to fasten the support bracket to the mirror arm of the vehicle.

In one aspect, the overhead mirror unit is positioned to allow the operator to see the area to the rear and above the vehicle when the operator is seated in the driver's seat of the vehicle.

In one aspect, the vehicle is a truck, preferably, the truck is a garbage or a dump truck, and even more preferably, a front loading garbage trucks, dump trucks with overhead curtains and closures, and trailer mounted crane or boon trucks.

According to an embodiment, there is provided a rear view mirror system for a vehicle comprising:
a rear view mirror assembly comprising a housing configured for mounting to the vehicle; one or more mirror units disposed in the housing, wherein each mirror unit comprises a reflective mirror element and a mirror mount for securing the mirror element within the housing, wherein at least one mirror unit is an overhead mirror unit that is positioned to allow an operator in the vehicle to see an area to the rear and above the vehicle; and
a controller operably connected to the assembly and configured to allow the operator, upon actuation of the controller, to remotely move at least one of the one or more mirror elements to a desired viewing position.

The foregoing has outlined in broad terms some of the more important features of the invention disclosed herein so that the detailed description that follows may be more clearly understood, and so that the contribution of the named inventors to the art may be better appreciated. The invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings, wherein:

FIG. 7 is an exploded front perspective view of the assembly of FIG. 3 showing a plurality of mirror units, mirror carriers, and mirror mounts, support bracket, and housing according to an embodiment of the invention;

FIG. 9 is an exploded and enlarged front perspective view of the mirror mounts and power cord and wire harness of the assembly of FIG. 7;

DETAILED DESCRIPTION

Figure 1:
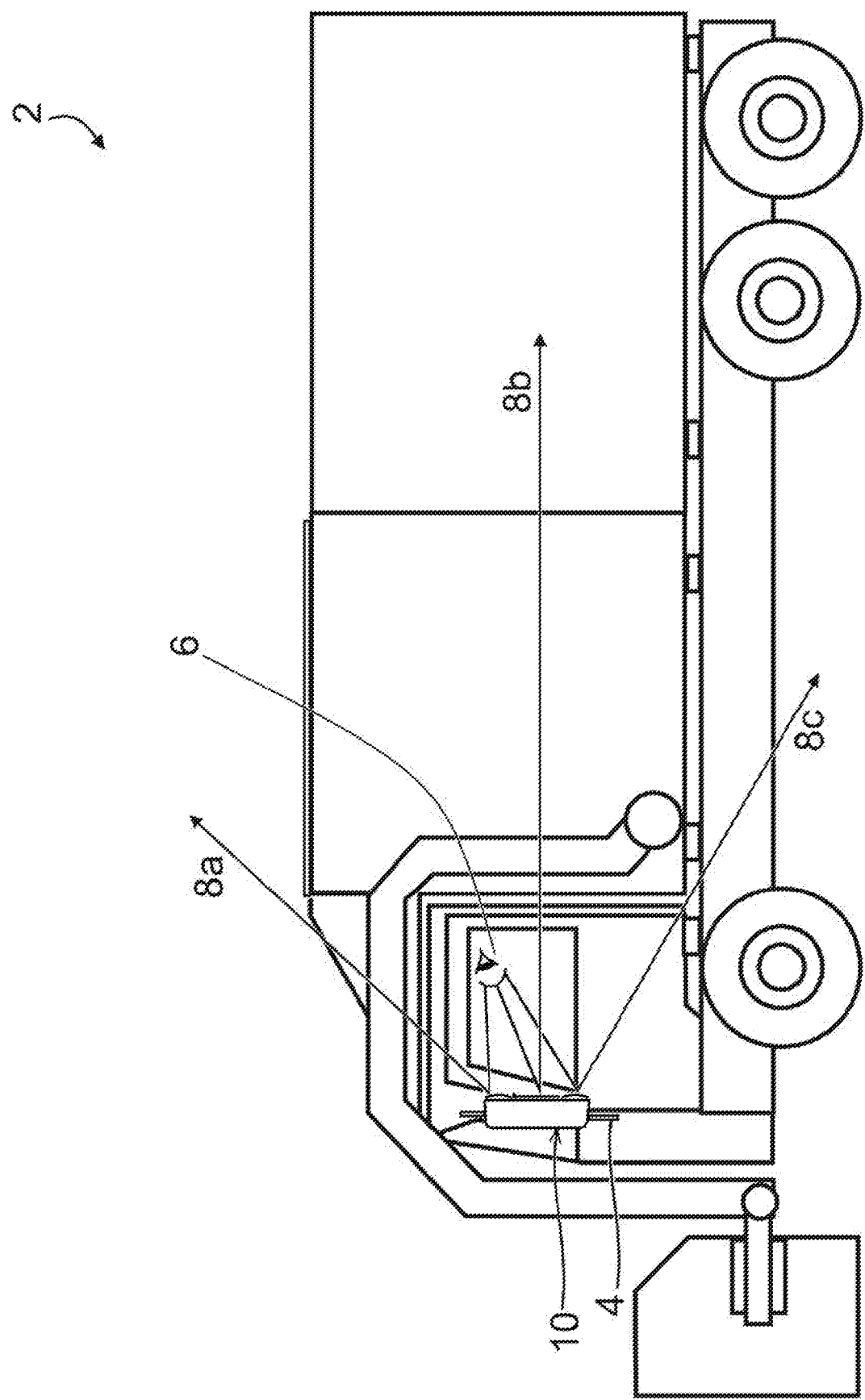
FIG. 1 is a side view of front loading garbage vehicle showing rear view mirror rays.

Reference will be made below in detail to exemplary embodiments of the invention, examples of which are illustrated in the accompanying drawings. Wherever possible, the same reference numerals used throughout the drawings refer to the same or like parts.

Referring now to the drawings in greater detail, FIGS. 1 to 11 illustrate an embodiment 10 of the exterior rear view mirror assembly of the invention which is configured for use on vehicles, such as trucks, preferably large garbage trucks or large dump trucks, and more preferably front loading garbage trucks.

Figure 2:
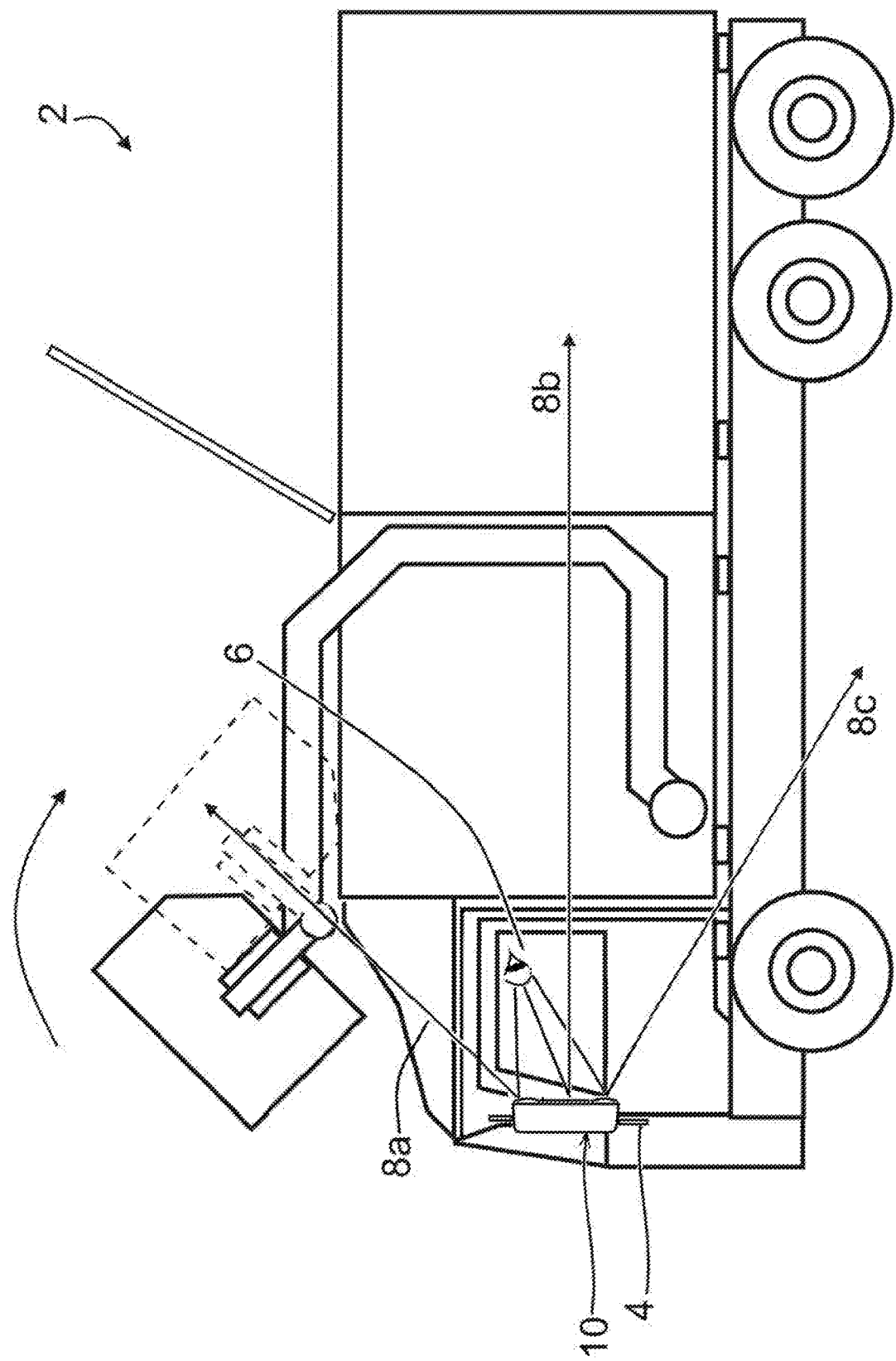
FIG. 2 is a side view of frontend loading garbage vehicle of FIG. 1 when the refuse bin is being emptied showing rear view mirror rays.
Figure 4:
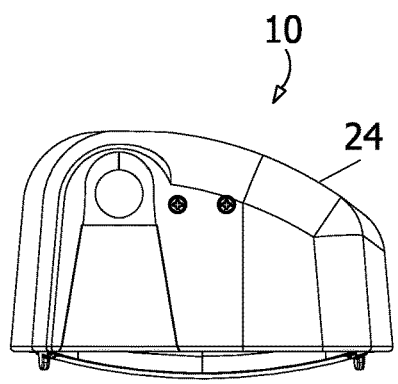
FIG. 4 is a top view of the assembly of FIG. 3.
Figure 6:
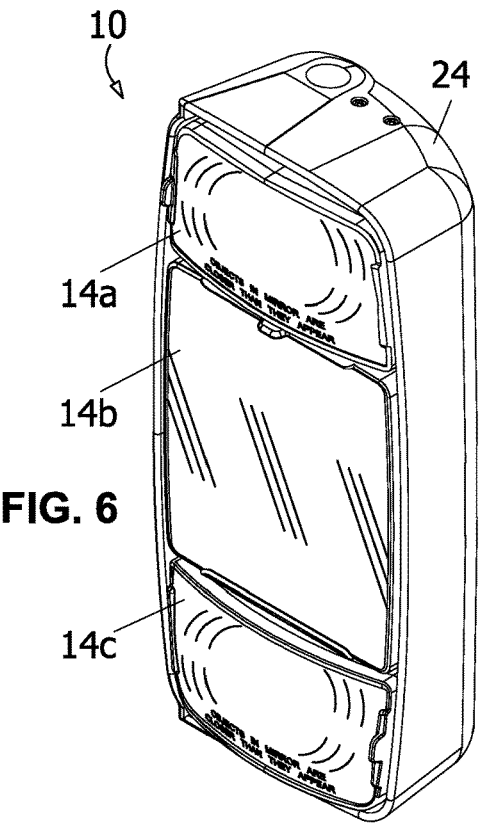
FIG. 6 is a front perspective view of the assembly of FIG. 3.
Figure 3:
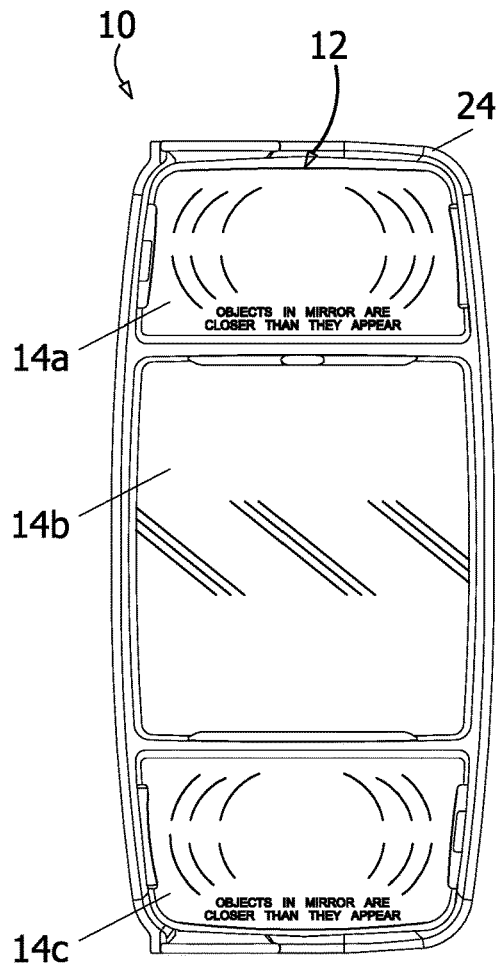
FIG. 3 is a front view of the rear view mirror assembly according to an embodiment of the invention.
Figure 5:
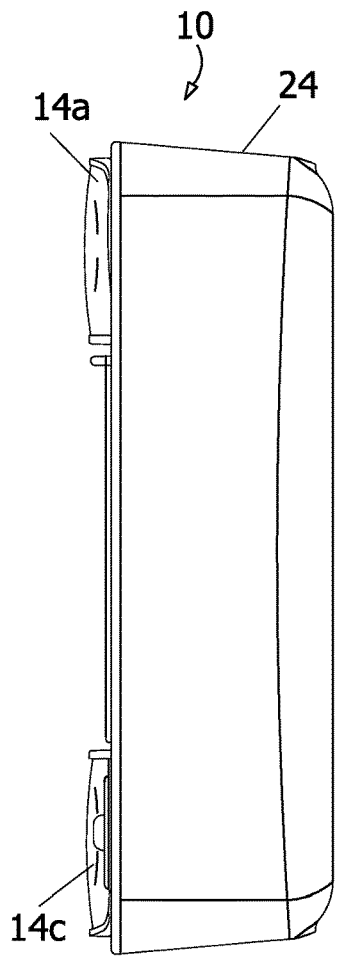
FIG. 5 is a side view of the assembly of FIG. 3.
Figure 8:
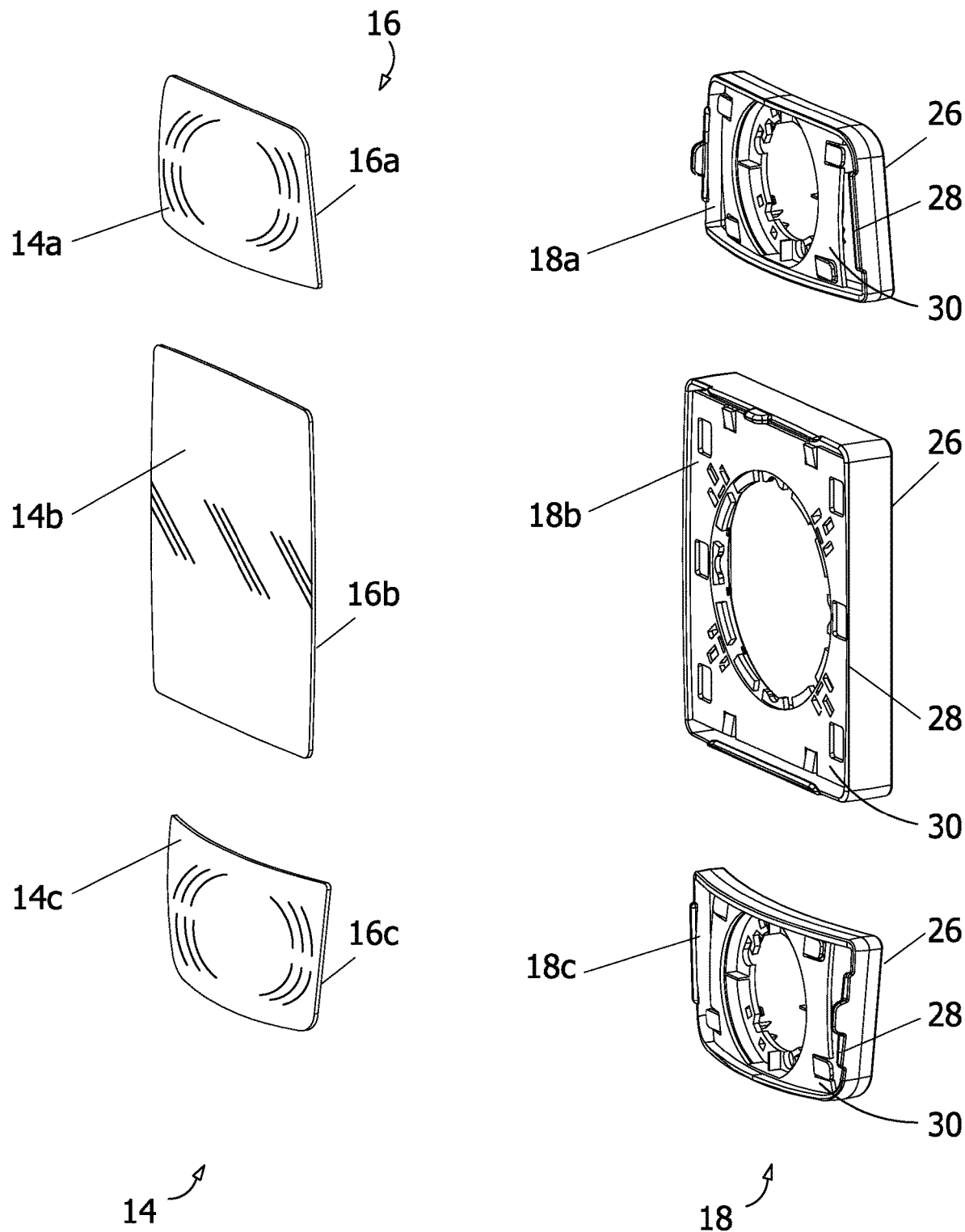
FIG. 8 is an exploded and enlarged front perspective view of the mirror elements and mirror carriers of the assembly of FIG. 7.

Shown in FIGS. 1 and 2 is a vehicle 2 (such as a front loading garbage truck) comprising a rear view mirror assembly 10 mounted to a mirror arm 4 at the front or very close to the front end or the cab, adjacent to a driver seat for an operator 6 of the vehicle 2. When in use, the view rays of the mirror assembly 10 as observed by the operator 6 are indicated by rays 8a, 8b, and 8c.

Assembly 10 generally comprises one or more mirror units 12. As shown in FIGS. 3 to 11, assembly 10 comprises a plurality of mirror units 12, wherein each one of these mirror units 12 includes respective reflective mirror elements 14, resistive heating elements 16 applied to the rear surface of each of the mirror elements 14, a mirror carrier 18 for supporting each of the mirrors 14, and a mirror mount 20 operatively connected to each one of the mirrors 14. Assembly 10 further comprises a support bracket 22 configured for securing each mirror unit 12 and for securing the assembly 10 to the vehicle 2. Assembly 10 further comprise a housing or shell 24 supported by support bracket 22.

As shown in FIGS. 3, 5, and 6 to 8, assembly 10 comprises three individual mirror units 12, namely, 12a, 12b, and 12c, wherein the purpose of each individual mirror unit 12a, 12b, and 12c will be described in further detail below. In accordance with the above, mirror unit 12a therefore, includes mirror element 14a, resistive heating element 16a, a mirror carrier 18a for supporting mirror 14a, and a mirror mount 20a operatively connected to mirror 14a. It follows that mirror unit 12b, includes mirror element 14b, resistive heating element 16b, a mirror carrier 18b for supporting mirror 14b, and a mirror mount 20b operatively connected to mirror 14b. And similarly, mirror unit 12c, includes mirror element 14c, resistive heating element 16c, a mirror carrier 18c for supporting mirror 14c, and a mirror mount 20c operatively connected to mirror 14c.

Mirror elements 14a and 14c each have a convex shape and mirror element 14b is flat. However, it will be appreciated that mirror elements 14b and 14c can have any combination of flat and convex shaped parts. Preferably, mirror element 14b is about 8×8" flat glass.

The heating element 16 is preferably adhered to the rear surface of mirror element 12 with a suitable adhesive or tape (not shown).

Mirror element 14 and heating element 16 are preferably supported and adhered to mirror carrier 18. Mirror carrier 18 has a substantially rectangular shape corresponding to the shape of the mirror element 12. Carrier 18 includes a rear wall 26 and an outwardly extending peripheral side edge or rim 28 which defines a forwardly facing recess 30 which is dimensioned receive mirror element 14 and to secure mirror element 14, preferably by an adhesive, such as for example, double-faced tape (not shown).

Mirror mount 20 is configured to be secured to the support bracket 22 and is adjustable to provide adjustable movement of the support mirror element relative to the support bracket 22. Mirror mount 20 includes a forward portion 32 defining one or more apertures 33. Mirror mount 20 also includes a rear portion 34 defining one or more mounting holes 36 for mounting mirror mount 20 to the support bracket 22. In one embodiment, mirror mounts 20a and 20c each comprise three mounting holes 36a, 36c and mirror mount 20b comprise five mounting holes 36b. Further, mirror mounts 20a, 20b, 20c are shown to respectively comprise forward portions 32a, 32b, 32c which each define apertures 33a, 33b, 33c, and respectively comprise rear portions 34a, 34b, 34c.

In one embodiment, the mirror mount 20 is preferably an electrically-operated, adjustable mounting assembly comprising one or more motors 38 secured to forward portion 32 of mount 20. The motor 38 is connected a controller 39 for moving mirror element 14 to various viewing positions when the controller 39 is operated and a source of electrical power (not shown) in the vehicle 2 by means of a power cord 40 including a wire harness 42. One or more motor screws 38d are dimensioned to be received in apertures 33 to secure the motor 38 to the mirror mount 20.

In an embodiment, mirror mount 20a may further comprise an adapter 43 configured between the motor 38a and the front portion 32a of mount 20a. Adapter 43 may define one or more apertures 44 configured to receive motor screws 38d to secure the motor 38a to the adapter 43. Adapter 43 may itself define one or more apertures 45 configured to receive adapter screws 44b to secure the adapter 43 to the mirror mount 20a via apertures 33a.

Figure 10:
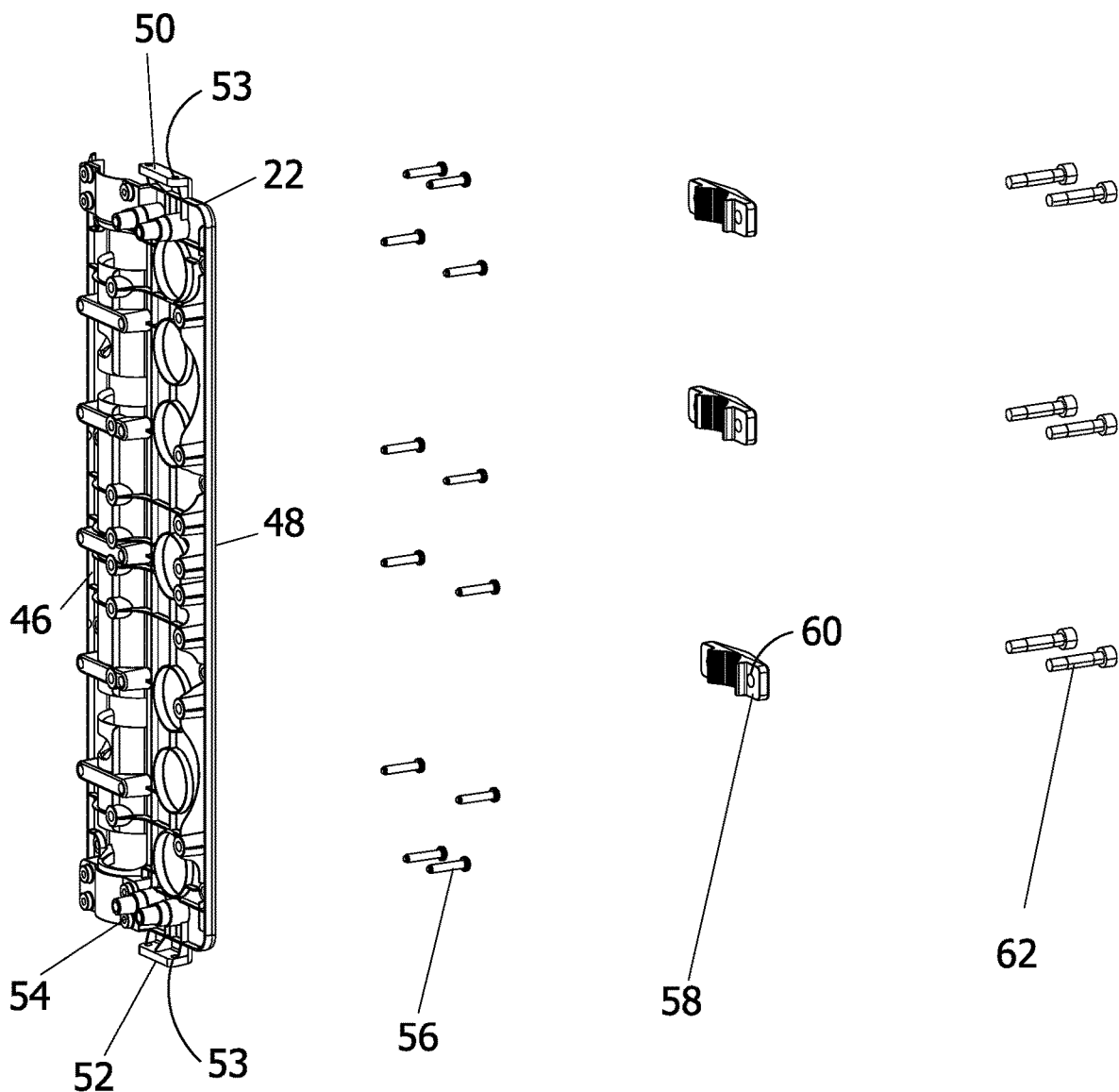
FIG. 10 is an exploded and enlarged front perspective view of the support bracket of the assembly of FIG. 7.
Figure 11:
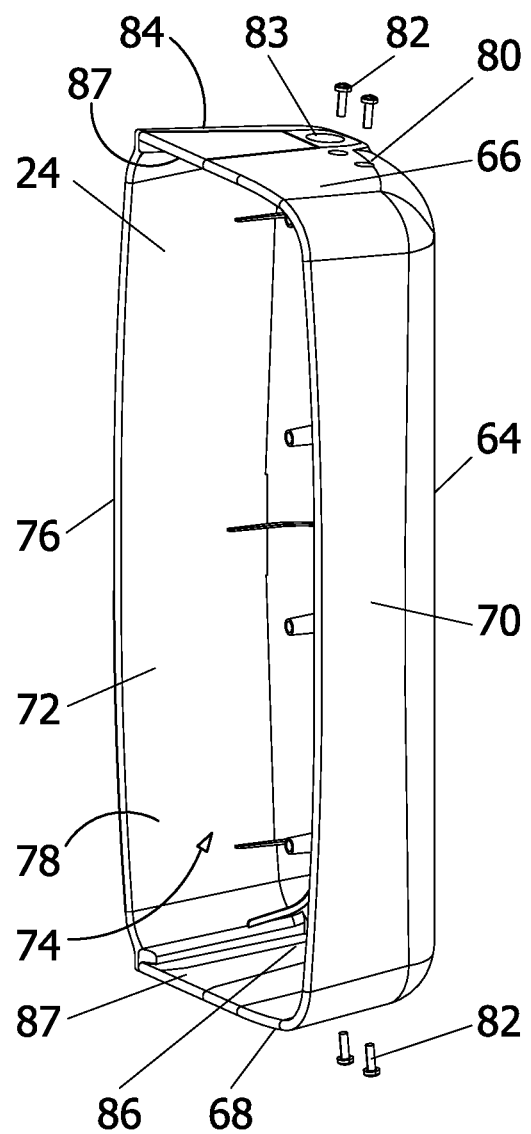
FIG. 11 is an enlarged front perspective view of the housing of the assembly of FIG. 7.

As shown in FIGS. 7 and 10, the support bracket 22 is an elongated frame with front and rear surfaces 46, 48 and two ends 50, 52, the support bracket 22 being configured to receive and secure the plurality of mirror units 12 and to secure the mirror assembly 10 to mirror arm 4 of vehicle 2. Each of the ends 50 and 52 comprise one or more apertures 53.

According to an embodiment, between the two ends 50, 52, the frame defines a plurality of bracket holes 54 which extend into the frame and are dimensioned for receiving various suitably-sized securing screws 56 to fasten various structures to the support bracket 22, as discussed below.

Individual mirror units 12 are mounted onto support bracket 22 by positioning mirror units 12 on the front surface 46 of support bracket 22 and aligning the mounting holes 36 of the mirror mounts 20 with the bracket holes 54 and then inserting suitably-sized securing screws 56 to fasten the mirror units 12 to the support bracket 22.

The assembly 10 is mounted by positioning the rear surface 48 of support bracket 22 parallel to mirror arm 4. A plurality of clamp members 58 each defining an aperture 60 therein are coupled to the support bracket 22 by aligning the aperture 60 with the bracket holes 54 and inserting suitably-sized securing screws 62 to fasten the assembly 10 to the mirror arm 4.

As best seen in FIGS. 3 to 7 and 11, housing 24 is a thin, one piece shell including a rear wall 64, top 66 and bottom 68 end walls and opposing side walls 70, 72 defining an interior space 74. The end walls 66, 68, and side walls 70, 72 define a peripheral rim 76 and a viewing opening 78 adjacent the plurality of mirror elements 14 of the mirror units 12 when in use.

Housing 24 is also preferably rounded as shown to include a smooth, aerodynamic shape, and at least partially shields mirror units 12 and the support bracket 22, from the outside elements. The end walls 66, 68 define one or more apertures 80 configured to align with the one or more apertures 53 in ends 50 and 52. The housing 24 is secured to the support bracket 22 by inserting suitably-sized screws 82 into the apertures 80 and 53. The end walls 66, 68 can also define a respective top and bottom peripheral rims 84, 86 dimensioned to receive the mirror arm 4 therethrough. In one embodiment, when it is desired to mount the assembly 10 to the vehicle, the support bracket 22 is first secured to the mirror arm 4 using the means for mounting the support bracket 22 as discussed above. The housing 24 is then placed over the mirror arm 4 from one side and when the mirror arm 4 is set in the desired position about region 83 of end walls 66, 68, the housing 24 is then secured to the support bracket 22 as discussed above. End tabs 87 are then inserted into the top and bottom peripheral rims 84, 86 to seal the peripheral rims 84, 86 of the housing 24 so that it can assume a bowl-like shape.

In the embodiment shown, when the assembly 10 is assembled, the housing 24 provides a shield against the effects of wind and weather while support bracket 22 provides the structural support for mirror units 12 comprising the mirror element 14, heating elements 16, and mirror carrier 18 and is used to secure the assembly 10 to the mirror arm 4 of the vehicle 2. However, it will appreciated that the plurality of mirror units 12 need only to be disposed or substantially disposed within the housing 24 and that housing 24 can be configured to provide the structural support for the mirror units 12 and be configured to secure the assembly 10 to the mirror arm 4 of the vehicle 2.

While assembly 10 is depicted with three mirror units 12 (namely, mirror units 12a, 12b, and 12c) that are arranged in a linear arrangement where mirror unit 12a is positioned on top of mirror unit 12b which in turn is positioned above mirror unit 12c, the invention is not so limited. The assembly 10 can include one, two or more mirror units 12 as desired. Mirror units 12 may also be arranged in other geometric arrangements as desired for other applications.

Figure 12:
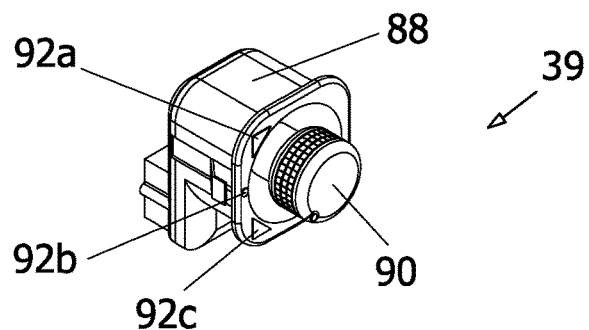
FIG. 12 is a front perspective view of the controller for moving the mirror element to various viewing positions according to an embodiment of the invention.
Figure 13:
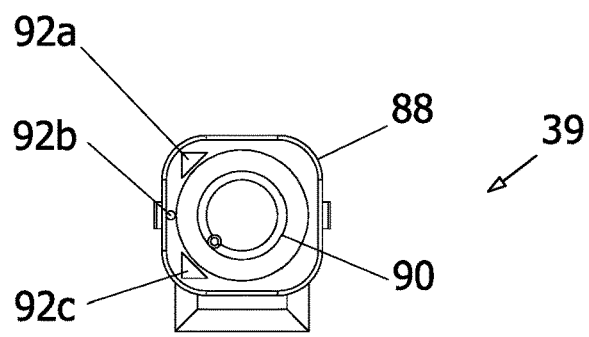
FIG. 13 a front view of the controller of FIG. 12.
Figure 14:
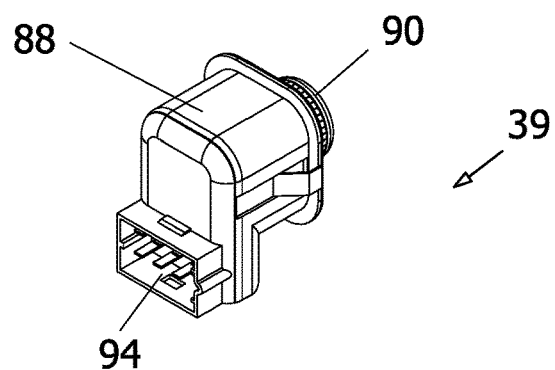
FIG. 14 is a rear perspective view of the controller of FIG. 12.

According to one embodiment, the controller 39 is configured to remotely make adjustments of the mirror element 14 to various viewing positions when the controller 39 is actuated by the operator 6 from within the cab of the vehicle 2. As shown in FIGS. 12 to 14, controller 39 is a left-handed finger operated switch including a body 88 and a knob 90 moveably secured within the body 88.

The knob 90 is pivotally moveable from a central rest position to a plurality of positions corresponding to a distinct direction that the operator wishes to move a particular mirror element 14 towards. Knob 90 is also rotatably moveable between three positions 92a, 92b, or 92c, where each position corresponds to a respective mirror element 14a, 14b, or 14c.

Electric contacts 94 allow controller 39 to operably connected with a vehicle control system (not shown) which is operably connected to the assembly 10 and source of electrical power (not shown) in the vehicle 2.

To operate the controller 39, the operator would select a desired mirror unit 12a, 12b, or 12c by rotating the knob 90 to any one of positions 92a, 92b, or 92c. Then, the viewing position of the respective mirror element 14 can be adjusted by titling the knob 90 in the desired direction. As shown in FIGS. 12 and 13, the knob 90 has been rotated to position 92c so that if the knob 90 is titled in a particular direction, this will result in a corresponding movement of mirror element 14c in that particular direction.

In the embodiment shown in FIGS. 12 to 14, the controller 39 is a left-handed controller, however, the controller 39 can also be configured for right-handed use, for example, by reversing the orientation of the controls. Additionally, controller 39 may be configured to adjust more or less than three mirror units 12, as desired.

According to one embodiment, in use, images reflected by the mirror assembly 10 will show three general spaces behind the operator 6 of the vehicle 2. The overhead mirror unit 12a will be able to show an image generally above the vehicle 12 and rear of the driver's seat of the vehicle 12 as depicted by mirror ray 8a. This positioning of the overhead mirror unit 12a enables the operator 6 in the driver's to safely survey the environment in and about the area above and to the rear of the front end (or the cab) of the vehicle 2, so for example, the operator 6 when seated in the driver's seat a front loading garbage truck 2 can view the lifting and rotation steps during the procedure of dumping refuse of the trash container into the truck 2. In some aspects, reflective mirror element 14a is a convex mirror that provides a wider field of view (as opposed to plain/flat mirrors) because of their outward curvature. However, overhead mirror unit 12a need not be limited to comprising a convex reflective mirror element 14a so long as mirror element 14a can be directionally aimed or pointed to reflect the area behind the operator and above vehicle 12 as depicted by mirror ray 8a in FIGS. 1 and 2.

According to one embodiment, mirror unit 12b may be arranged to show an image predominantly to the left side and to the rear of the vehicle as depicted by mirror ray 8b. Mirror unit 12c may be positioned to reflect an image predominantly close to the left side of a vehicle and just rearward of mirror assembly 10 (also known as the "blindspot" of the vehicle) as depicted by mirror ray 8c.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

It is to be understood that were the specification or claims refer to relative terms, such as "front," "rear," "lower," "upper," "horizontal," "vertical," "above," "below," "up," "down," "top," "bottom," "left," and "right" as well as derivatives thereof (e.g., "horizontally," "downwardly," "upwardly" etc.), such reference is used for the sake of clarity and not as terms of limitation, and should be construed to refer to the orientation as then described or as shown in the drawings under discussion. These relative terms are for convenience of description and do not require that the apparatus be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Thus, the invention is well adapted to carry out and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

The invention claimed is:

1. A rear view mirror assembly for a vehicle, the vehicle comprising a front loading garbage truck, a dump truck, a trailer mounted crane truck, or a boom truck, the mirror assembly comprising:
   a housing configured for mounting to the vehicle;
   at least three (3) mirror units disposed and secured in the housing, each of the mirror units comprising a reflective mirror element and a mirror mount for securing the respective mirror element within the housing, wherein at least one mirror unit is an overhead mirror unit positioned above the other mirror units, wherein at least one mirror unit is positioned below the overhead mirror unit, the reflective mirror element of the overhead mirror unit positioned outside the housing and is configured to allow an operator in the vehicle to see an area that is behind the operator and above the vehicle.

2. The assembly of claim 1 wherein the mirror element of the overhead mirror unit has a convex shape.

3. The assembly of claim 1 and wherein at least one of the mirror units is positioned below the overhead mirror unit comprises another reflective mirror element that is flat and/or has a convex shape.

4. The assembly of claim 3 wherein at least one of the mirror units further comprises a heating element secured the rear surface of the mirror element.

5. The assembly of claim 4 wherein at least one of the mirror units further comprises a mirror carrier positioned between the mirror element and the mirror mount, the mirror carrier configured to support the mirror element.

6. The assembly of claim 5 wherein the mirror carrier comprises a forward facing peripheral rim defining a recess dimensioned to secure the mirror element.

7. The assembly of claim 6 wherein the mirror mount is adjustable to provide movement of the mirror element within the housing to different viewing positions.

8. The assembly of claim 7 wherein the mirror mount comprises a motor configured for moving each of the mirror element to various viewing positions when the motor is actuated.

9. The assembly of claim 8 wherein the housing has first and second end walls, first and second side walls, a rear wall, wherein the first and second end walls and the first and second side walls define a peripheral rim defining an interior space within the housing and an opening adjacent the one or more mirror units.

10. The assembly of claim 9 further comprising a support bracket disposed within the interior space of the housing, the bracket having two ends, one end positioned adjacent the first end wall and the other end positioned adjacent the second end wall, wherein between the two ends, the bracket comprises: a mirror unit mount means configured to secure each of the mirror mounts; an assembly mount means to secure the mirror assembly to the vehicle; or a combination thereof.

11. The assembly of claim 10 wherein the mirror unit mount means comprises: bracket holes formed in the support bracket; and mounting holes formed in the mirror mount configured to align with the bracket holes, wherein the bracket holes and the mounting holes are dimensioned to receive a suitably-sized screw therein to fasten the at least one mirror unit to the support bracket.

12. The assembly of claim 10 wherein the assembly mount means comprises: bracket holes formed in the support bracket; and clamp members defining an aperture therein and configured to align with the bracket holes, wherein the support bracket and clamp member are configured to received therebetween a mirror arm of the vehicle and the bracket holes and the aperture are dimensioned to receive a suitably-sized screw therein to fasten the support bracket to the mirror arm of the vehicle.

13. The assembly of claim 10 wherein the housing is a single continuous unit.

14. The assembly of claim 1 wherein the overhead mirror unit is positioned to allow the operator to see the area that is behind the operator and above the vehicle when the operator is seated in a driver's seat of the vehicle.

15. A rear view mirror system for a vehicle comprising: the rear view mirror assembly of claim 1; and
a controller operably connected to the assembly and configured to allow the operator, upon actuation of the controller, to remotely and independently move at least one each of the one or more mirror elements to a desired viewing position.

16. A rear view mirror assembly for a vehicle, the vehicle comprising a front loading garbage truck, a dump truck, a trailer mounted crane truck, or a boom truck, the mirror assembly comprising:
a housing configured for mounting to the vehicle;
a first, a second and a third mirror unit, each mirror unit comprising a reflective mirror element and a mirror mount for securing the respective mirror element within the housing, the first mirror unit comprising an overhead reflective mirror that is positioned outside the housing and is configured to allow an operator in the vehicle to see an area that is behind the operator and above the vehicle, the second mirror unit comprising a flat reflective mirror to allow an operator in the vehicle to see an area to the side and to the rear of the vehicle, the third mirror unit comprising a convex reflective mirror to allow an operator in the vehicle to see an area to the side of the vehicle and in the vehicle's side blind spot,
the first mirror unit positioned within the housing above the second mirror unit, the second mirror unit positioned within the housing above the third mirror unit.

17. The rear view mirror assembly of claim 16 wherein the overhead reflective mirror is a convex mirror.

18. The rear view mirror assembly of claim 17 wherein the viewing position of each of the first, second and third mirror units is independently and remotely adjustable by the operator from within the vehicle.

19. The rear view mirror system of claim 15 wherein the controller comprises a knob moveably secured within a body, the knob being:
rotatably moveable relative to the body to select one of the one or more mirror elements to move; and
pivotably moveable relative to the body to direct the selected one of the one or more mirror elements to the desired viewing position.

* * * * *